Oct. 25, 1949.   B. M. V. AMELSVOORT   2,486,092
WELDING ELECTRODE HOLDER
Filed Feb. 5, 1947   2 Sheets-Sheet 1

B. M. V. AMELSVOORT
INVENTOR
BY
AGENT

Oct. 25, 1949.          B. M. V. AMELSVOORT          2,486,092
                         WELDING ELECTRODE HOLDER
Filed Feb. 5, 1947                                2 Sheets-Sheet 2
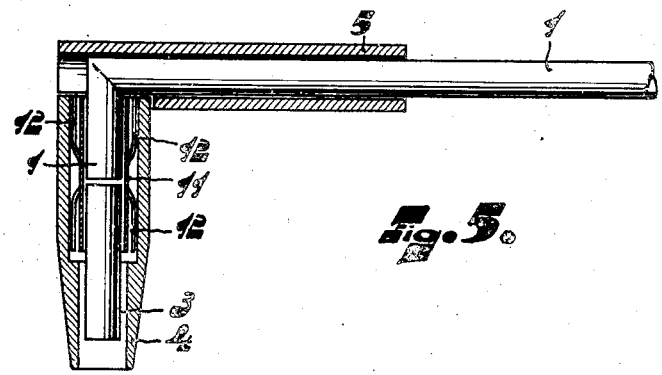
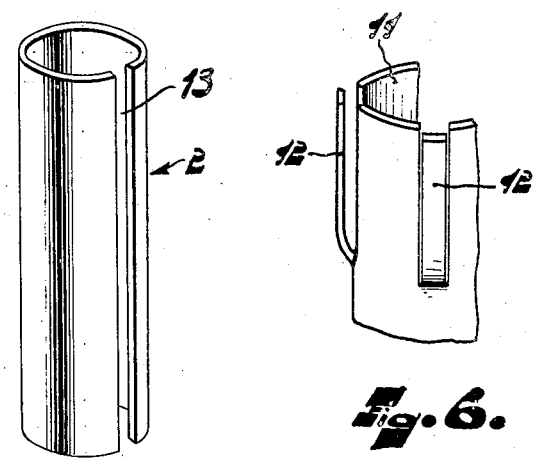
B.M.V. AMELSVOORT
     INVENTOR
   BY
       AGENT

Patented Oct. 25, 1949

2,486,092

UNITED STATES PATENT OFFICE 2,486,092

WELDING ELECTRODE HOLDER

Bernardus Maria v. Amelsvoort, Eindhoven, Netherlands, assignor to Hartford National Bank and Trust Company, Hartford, Conn., as trustee Application February 5, 1947, Serial No. 726,548
In the Netherlands April 26, 1944

Section 1, Public Law 690, August 8, 1946
Patent expires April 26, 1964

6 Claims. (Cl. 219—8)

This invention relates to a welding iron for electric-arc welding of small work pieces, comprising a handle and a rigidly secured welding electrode which is surrounded by a mouthpiece, in which the material of the mouthpiece and of the welding electrode are not used as welding material, and the welding electrode is arranged at an angle with respect to the handle.

The expression "rigidly secured welding electrode" is to be understood to mean an electrode which is not set into motion, for instance vibrated, by some ignition mechanism.

According to the invention the mouthpiece and the handle are united to form an assembly by a resilient clamping through the intermediary of at most one additional coupling member. This implies that there need not be a coupling member, if the mouthpiece is directly clamped against the handle.

The construction according to the invention has various advantages.

Primarily the construction is extremely simple due to the absence of a special ignition device for the welding electrode and in addition by the use of a minimum number of parts, which permits cheap mass-production. In this respect it is pointed out that there are various fields of application where a rigidly secured welding electrode, for instance in the form of a carbon electrode, yields excellent hand-made welds.

Another advantage of cheap mass-production consists in that the weight of this extremely simple welding iron may be kept very low due to its small size. The weight of a practical construction amounts to about 50 grams. This permits easy handling of the apparatus, so that the operator does not soon get tired.

In addition it has been found that a low weight is essential to obtain good qualities of welds of this kind by using a welding iron having a rigidly secured welding electrode.

An additional advantage consists in the use of a resilient clamping, as a result of which the mouthpiece and the handle can be demounted by hand without the need for other tools, so that the whole interior of the welding iron is accessible. This is important with a view to saving time in exchanging the various parts and, if desired, may take place by the operators themselves. Generally the construction will preferably be so chosen that the mouthpiece is adjustable in an axial direction which permits readjustment at the correct height upon wearing off of the welding electrode.

In general, the use of a coupling member is of importance for the use of a very thin handle which may, for instance, consist of a tube of insulating material.

In order that the invention may be more clearly understood and readily carried into effect it will now be described more fully with reference to the accompanying drawing, given by way of example.

Figure 1a is an enlarged perspective view of the spring bushing shown in Fig. 1.

Figure 5 is a cross-section of another form of welding iron according to the invention which comprises a specific clamping means.

Figure 6 is a fragmentary elevational detail view of the clamping means shown in Figure 5.

Figure 1:
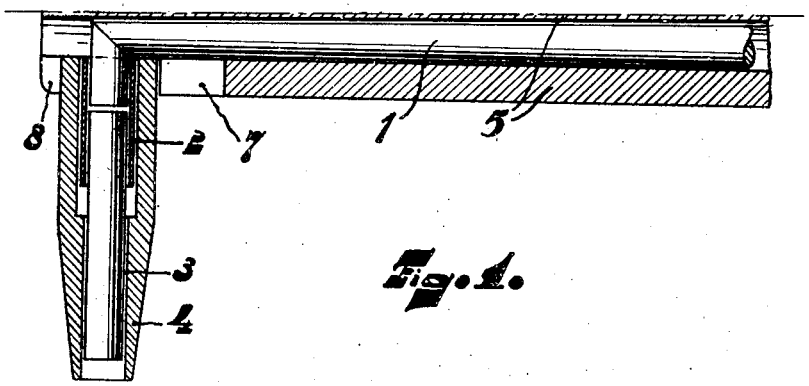
Figure 1 is a cross-section of a simple welding iron according to the invention.

In Figure 1 the supply conductor 1 is connected to the welding electrode, for instance a carbon electrode 3, through the intermediary of a spring bushing 2 which is provided with a cut-out portion 13 to give resiliency to bushing 2 whereby conductor 1 and electrode 3 may be clamped together since the diameter of bushing 2 is normally smaller than that of either the said conductor 1 or the electrode 3. The electrode 3 is surrounded by a mouthpiece 4 of insulating heat-resistant material, for instance ceramic material. The supply part 1 is surrounded by a handle 5 having at its end a round aperture 6 also having resilient characteristics and in which a mouthpiece 4 is inserted to be clamped thereby. In this case the resiliency is promoted by a cut-out portion 7, the aperture 6 opening at the other side into a wide cut-out portion 8.

In demounting, which may take place by hand, the mouthpiece 4 is drawn out of the aperture 6, whereupon the handle 5 can be moved to the right, so that the clamping bushing 2 may pass through the aperture 8. In this way the interior is accessible. In this form of construction a separate coupling member is superfluous.

Figure 3:
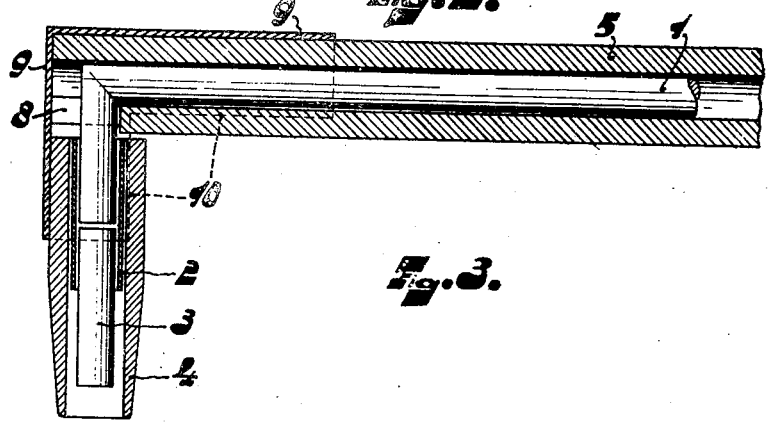
Figure 3 is cross-section of a modified form of welding iron according to the invention which comprises an additional coupling member having a very simple shape.
Figure 4:
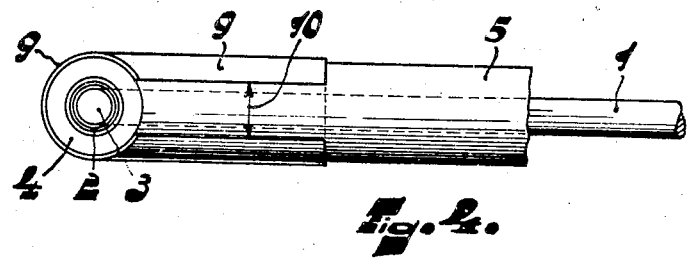
Figure 4 is a bottom view of the welding iron shown in Figure 3.

In the modification of the invention shown in Figures 3 and 4, the coupling member bears the reference number 9 and has a substantially L-shaped configuration and comprises the two connected portions 9' and 9" which are furnished with a continuous slot 10 through which, after the mouthpiece 4 has been drawn out of the coupling member, the parts forming an assembly may pass when the coupling member is detached from the handle by moving it to the left. In this case, also, a resilient clamping action is accomplished, as in the case of bushing 2 described above, by having the normal diameter of the resilient coupling member 9 smaller than that of the parts 4 and 5 to be clamped together.

Figure 2:
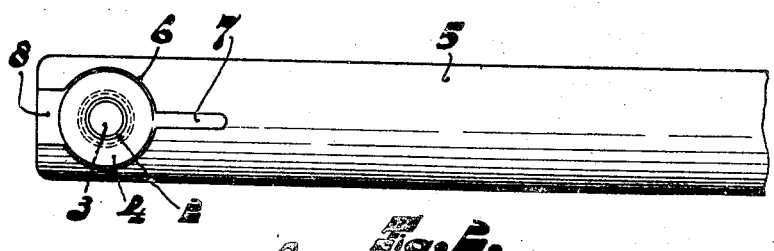
Figure 2 is a bottom view of the same welding iron shown in Figure 1.

In this construction a very thin handle may be used and the readjustment possibility of the mouthpiece in a direction along its axis is better than in the construction shown in Figs. 1 and 2.

Finally Fig. 5 represents a construction, in which the coupling member 11 is provided by a resilient clamping on the current carrying parts 1 and 3. The coupling member acts at the same time as a current carrying connecting member between these parts. As an alternative, however, separate members may be used for these functions within the mouthpiece. The tags 12 serve to clamp the mouthpiece in the operative position. Fig. 6 is a detail view of part of the coupling member 11.

In all executional examples the current carrying parts within the mouthpiece and the handle are united to form a rigid body, which promotes the handling in demounting, whilst obtaining a robust construction.

What I claim is:

1. A welding iron for electric-arc welding of small workpieces, comprising an insulating handle, a supply electrode housed therein, a welding electrode positioned at an angle with respect to said insulating handle, resilient clamping means comprising a tubular member removably fastening said welding electrode at said angle to said supply electrode, an insulating mouthpiece surrounding said welding electrode, said mouthpiece being arranged at said angle with respect to said handle, second resilient clamping means carried by said handle and including an aperture into which said mouthpiece is axially inserted, the resiliency of said second clamping means being such that said mouthpiece may be manually adjusted in a direction toward or away from said handle or to be completely removed from said assembly without the use of a tool.

2. A welding iron as claimed in claim 1 wherein said aperture included in said second resilient clamping means is in the body of said handle and has a diameter substantially that of said mouthpiece, a slot in said handle body extending substantially parallel to the main axis of said body and opening into said aperture whereby the resiliency of the material surrounding said aperture is enhanced.

3. A welding iron for electric-arc welding of small workpieces, comprising an insulating handle, a supply electrode therein axially thereof and having a portion extending at an angle to the remaining portion of said supply electrode, a welding electrode, means removably joining said welding electrode to said extending portion of said supply electrode, an insulating mouthpiece surrounding said welding electrode, said mouthpiece and said welding electrode therein being arranged at substantially the same said angle with respect to said handle and fitting over said extending portion, and resilient clamping means for removably attaching said mouthpiece to said handle and for permitting said mouthpiece to be manually adjusted in a direction toward or away from said handle or to be completely removed from said assembly without the use of a tool whereby said extending portion of said supply electrode may be exposed.

4. A welding iron as claimed in claim 3 wherein said resilient clamping means comprises an aperture in the body of said handle, said aperture having a diameter substantially that of said mouthpiece, a slot in said body extending substantially parallel to the main axis of said body and opening into said aperture whereby the resiliency of the material surrounding said aperture is enhanced, and a second slot opening at one end into said aperture at a location diametrically opposed to the location at which said first slot opens thereinto, said second slot opening out at the other end at the edge of said handle body, said second slot being of a width to permit passage of said portion of said supply electrode after said mouthpiece has been removed.

5. A welding iron as claimed in claim 3 wherein said resilient clamping means comprises a tubular element having two portions at an angle to each other one of which is telescoped over said handle body and the other of which is telescoped over said mouthpiece, said tubular element being a continuous slot along the entire length thereof whereby the resiliency is enhanced and said tubular element may be slid off said handle body to clear said extended portion of said supply electrode after said mouthpiece has been removed from said tubular element.

6. A welding iron as claimed in claim 3 wherein said joining means comprises a tubular element having the ends thereof frictionally telescoped over the ends of said extending portion of said supply electrode and said welding electrode, respectively, and said resilient clamping means comprises resilient projections on said tubular element for frictionally engaging said mouthpiece telescoped thereon.

BERNARDUS MARIA v. AMELSVOORT.

REFERENCES CITED

The following references are of record in the file of this patent:

UNITED STATES PATENTS

| Number | Name | Date |
|---|---|---|
| 1,296,358 | Bowers | Mar. 4, 1919 |
| 1,347,776 | Chadwick | July 27, 1920 |
| 2,277,894 | Welsh | Mar. 31, 1942 |